(12) United States Patent
Ellum et al.

(10) Patent No.: US 9,116,228 B2
(45) Date of Patent: Aug. 25, 2015

(54) LOW LATENCY CENTRALIZED RTK SYSTEM

(75) Inventors: Cameron Ellum, Calgary (CA); Paul Alves, Calgary (CA)

(73) Assignee: NovAtel Inc., Calgary (CA)

( * ) Notice: Subject to any disclaimer, the term of this patent is extended or adjusted under 35 U.S.C. 154(b) by 367 days.

(21) Appl. No.: 13/570,546

(22) Filed: Aug. 9, 2012

(65) Prior Publication Data

US 2014/0043187 A1 Feb. 13, 2014

(51) Int. Cl.
- G01S 19/45 (2010.01)
- G01S 19/04 (2010.01)
- G01S 19/05 (2010.01)
- G01S 19/09 (2010.01)
- G01S 19/43 (2010.01)

(52) U.S. Cl.
CPC ............... *G01S 19/04* (2013.01); *G01S 19/05* (2013.01); *G01S 19/09* (2013.01); *G01S 19/43* (2013.01)

(58) Field of Classification Search
CPC ......... G01S 19/45; G01S 19/04; G01S 19/05; G01S 19/09; G01S 19/43
USPC ............. 342/357.23, 357.26, 357.27, 357.28, 342/357.29
See application file for complete search history.

(56) References Cited

U.S. PATENT DOCUMENTS

| | | | |
|---|---|---|---|
| 6,618,004 B2 | 9/2003 | Fenton et al. | |
| 7,515,100 B2 | 4/2009 | Gradine et al. | |
| 7,746,272 B2 | 6/2010 | Vollath | |
| 8,223,068 B2 | 7/2012 | Allan et al. | |
| 2005/0080563 A1 | 4/2005 | Petrovski et al. | |
| 2010/0207817 A1 | 8/2010 | Brown | |
| 2012/0146847 A1* | 6/2012 | Janky et al. | 342/357.23 |
| 2012/0154215 A1 | 6/2012 | Vollath et al. | |
| 2012/0232724 A1* | 9/2012 | Janky et al. | 701/13 |
| 2013/0227154 A1* | 8/2013 | Wirola et al. | 709/228 |

OTHER PUBLICATIONS

Eleiche, M., "RTCM 3.1 Transformation Messages in RTK GNSS Networks" University of West Hungary Faculty of GeoInformatics, Jan. 2008, pp. 1-67, [online], {retrieved from the Internet: <URL: http://www.academia.edu/1470116/RTCM_3.1_Transformation_Messages_In_RTK_GNSS_Networks>.

* cited by examiner

*Primary Examiner* — Harry Liu
(74) *Attorney, Agent, or Firm* — Cesari and McKenna, LLP; Patricia A. Sheehan

(57) ABSTRACT

A low-latency centralized RTK system utilizes an RTK server to perform matched updates using base station GNSS measurements from one or more base stations and GNSS measurements from one or more rovers, and the one or more rovers produce RTK solutions based on the results of the matched updates. The RTK server includes one or more processors that perform the matched updates and a transmitter that transmits at least the ambiguities to the rovers. The respective rovers, which have processing power that is sufficient to quickly calculate RTK baselines, utilize the received ambiguities, the base station GNSS measurements received from either the RTK server or the base stations, known base station positions and instantaneous GNSS measurements at the rovers to readily determine and update their RTK baselines and their precise positions.

20 Claims, 2 Drawing Sheets

LOW LATENCY CENTRALIZED RTK SYSTEM

BACKGROUND OF THE INVENTION

1. Field of the Invention

The invention relates generally to real time kinematic (RTK) systems and, more particularly, to RTK systems utilizing central processing.

2. Background Information

RTK systems typically utilize one or more GNSS reference receivers, or base stations, with known locations that provide GNSS pseudorange and carrier phase observables and, optionally, associated correction information to remote receivers, or rovers. The GNSS pseudorange, carrier phase observables and, as appropriate, correction information are collectively referred to herein as "the base station GNSS measurements." The rovers use their own GNSS measurements and the base station GNSS measurements to determine RTK solutions. The rovers thus determine baselines to the respective base stations and use the baselines, in a known manner, to determine their own precise positions. The correction information relates to satellite signal delays associated with changes in satellite orbits, and so forth, which would otherwise introduce errors into the rover position calculations.

The base stations, operating in a known manner, transmit or broadcast the base station GNSS measurements to the rovers. The rovers use their own GNSS measurements and the base station GNSS measurements to calculate estimates of the real-valued carrier cycle ambiguities and resolve the ambiguities into integers. The rovers may also, as appropriate, use the measurements to estimate atmospheric, geometric, and other environmental errors based on system models that are maintained at the rovers. The rovers then use the ambiguities and the error estimates to ultimately determine precise positions. The various calculations performed by the rover utilize rover GNSS measurements that are closely matched in time with the base station GNSS measurements provided by the one or more base stations. Accordingly, the operations are commonly referred to as "matched updates."

Before performing a matched update, a given rover must wait to receive the base station GNSS measurements from the one or more base stations. The rover then matches the received measurements with the GNSS measurements retained over the same time period by the rover, and performs the necessary, processing-intensive calculations to estimate the real-valued ambiguities and then resolve the ambiguities to integers. As appropriate, the rovers also perform the processing-intensive calculations necessary to update the system models. Due to the wait for receiving GNSS measurements from the base stations there is inherent latency associated with the processing-intensive calculations performed by the given rovers.

In parallel with the matched update the given rover extrapolates the base station GNSS measurements to the current time and calculates updated baselines and positions, based on the instantaneous GNSS measurements made by the rover and the calculated ambiguities from the most recent matched update. The extrapolation, however, introduces errors into the precise position calculations, and the longer the latency associated with the matched update, the more error is introduced into the baseline and position calculations.

The rover performs the matched updates to estimate and resolve the ambiguities at least each time the rover loses lock, which may occur, for example, when the rover travels under a bridge, in a tunnel, under tree canopy or through an urban canyon, and also each time a new satellite rises sufficiently above the horizon for its signals to be included in the position calculations. Also, the matched updates may be performed periodically between such events, to ensure that the error introduced into the position calculations by the extrapolation of the base station GNSS measurements is kept to an acceptable level.

There is a trade-off between the time required to perform the matched updates and the precision of the calculated positions. Accordingly, to minimize the latencies associated with the matched updates, the rovers must have sufficient processing capacity and available power to perform the processing intensive calculations for resolution of the ambiguities relatively quickly using the matched data sets. The respective rovers are therefore complex and expensive.

Centralized RTK systems utilize low cost slave receivers in place of the rovers. The slave receivers provide GNSS measurements to a central processing facility that also receives the GNSS measurements from the respective base stations. The central facility performs the calculations to resolve the carrier cycle ambiguities, update the system models and calculate the precise positions of the slave receivers. The facility then provides the calculated precise positions to the respective slave receivers. The trade-off in such a system is between the use of the low cost slave receivers and the increased latency of the precise position information provided to the slave receivers by the central facility.

While such centralized RTK systems tend to work well for certain applications, such as applications that utilize post-processed data, the relatively long latencies associated with providing the precise positions to the respective slave receivers is unacceptable for other applications in which the position information is required in a more timely manner by, for example, kinematic users.

SUMMARY OF THE INVENTION

A low-latency centralized RTK system includes an RTK server that performs matched updates using GNSS measurements from one or more the rovers and the base station GNSS measurements from one or more base stations. The RTK server provides at least the results of the matched updates to the rovers and the rovers produce RTK solutions.

The RTK server includes one or more processors that readily perform the matched updates and a transmitter that transmits at least the ambiguities to the rovers. The respective rovers, which each have processing power that is sufficient to quickly calculate RTK baselines, utilize the received ambiguities as well as the known positions of the one or more base stations, periodic base station GNSS measurements from the respective base stations, and instantaneous GNSS measurements made at the rovers to readily determine and update RTK baselines and their own respective positions.

The low-latency centralized RTK system takes advantage of the processing capacity of the one or more processors at the RTK server to relatively quickly perform the processing-intensive matched update calculations. The rovers then perform the less processing-intensive and lower power consuming RTK baseline and position calculations involving their own instantaneous GNSS observations and extrapolated base station GNSS measurements, to determine precise updated positions utilizing the results of the matched updates. Whenever new matched updates are performed, the RTK server provides updated ambiguities to the rovers, and the rovers continue their RTK baseline and position calculations using the updated ambiguities.

The system thus provides low latency RTK solutions at the rovers without having to utilize complex and expensive rovers.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
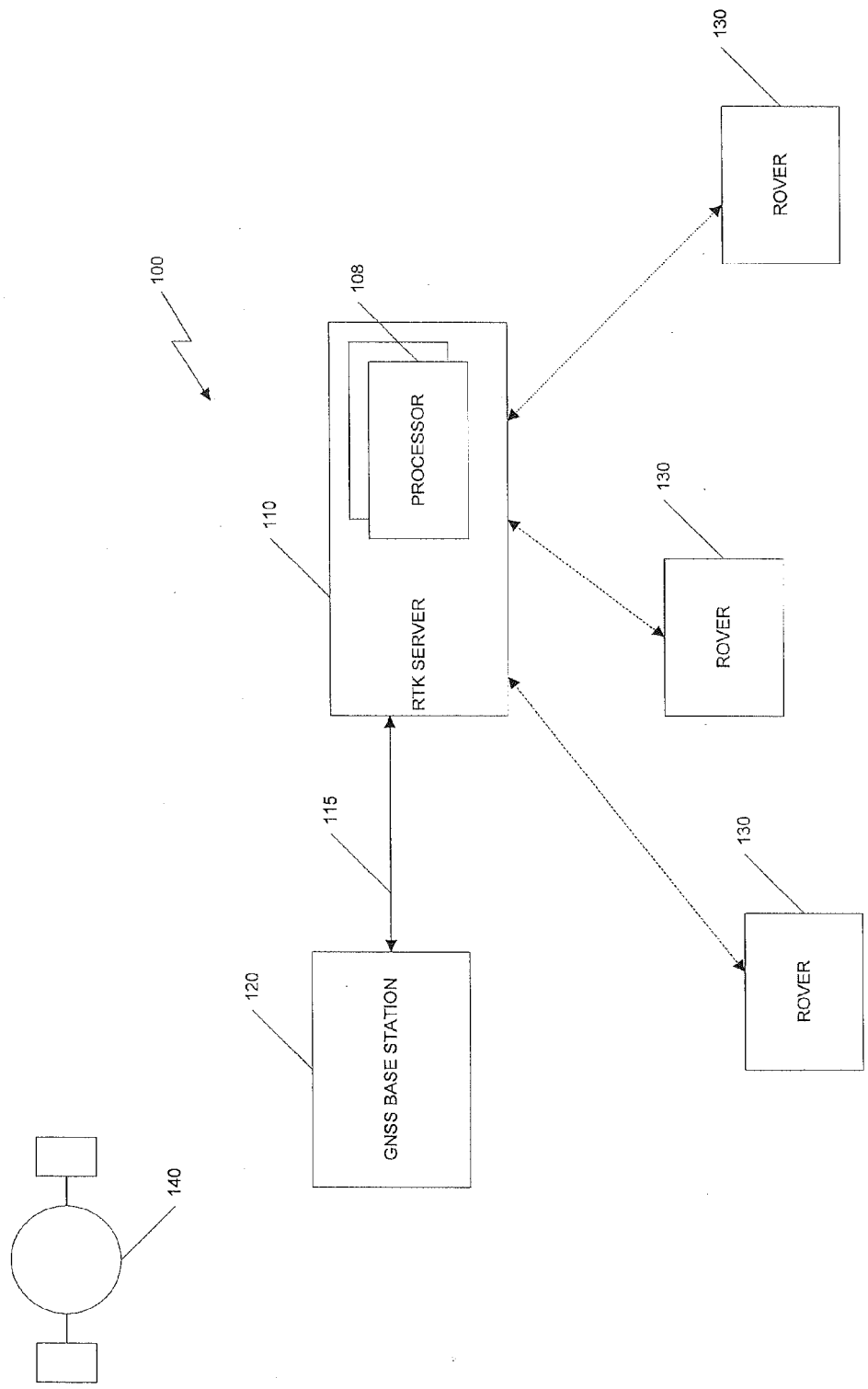
FIG. 1 is a functional block diagram of a system constructed in accordance with the invention.

Referring now to FIG. 1, a system 100 includes an RTK server 110 with one or more processors 108, which for convenience are referred to hereinafter singly and collectively as the "processor 108." The RTK server 110 receives base station GNSS measurements, which include GNSS observables, such as pseudoranges and carrier phase observables and as appropriate correction information, from one or more GNSS base stations 120. The RTK server also receives GNSS measurements from one or more rovers 130. In a first example, the system utilizes the base station GNSS measurements that are provided to the RTK server by a single base station. In the example, the RTK server may, but need not, be co-located with the base station.

The base station 120 is stationary and has an essentially clear view of the sky. The base station receives signals from GNSS satellites 140 in view and, operating in a known manner, acquires and tracks GNSS satellite signals and makes GNSS carrier phase observations, determines pseudoranges and, as appropriate, determines its position. The base station then provides the information, referred to singly and collectively as the "GNSS measurements," to the RTK server 110.

The RTK server 110 uses the base station GNSS measurements and the GNSS measurements from the respective rovers that correspond closely in time to perform matched updates that estimate and, as appropriate, resolve the carrier cycle ambiguities for the respective rovers. As also appropriate, the RTK server utilizes and updates system models, to estimate atmospheric, geometric, and/or other environment-based errors and produce correction information. The RTK server then transmits to the respective rovers at least the ambiguities, as either real-valued ambiguities or ambiguities resolved as integers, and, as appropriate, the correction information. A given rover then utilizes the received ambiguities and the correction information to determine RTK baselines and precise positions based on extrapolated base station GNSS measurements and instantaneous GNSS measurements made by the rover.

The base station GNSS measurements used by the rovers 130 may come directly from the base station, or the measurements may be forwarded from the RTK server 110 to the rovers. The RTK server may, alternatively, create a set of virtual base station GNSS measurements that account for the atmospheric, geometric, and other errors. Thus, the rover may no longer require the corrections as part of the base station GNSS measurements, and system bandwidth requirements are reduced.

The RTK server 110 utilizes the processor 108 to relatively quickly perform the processing-intensive calculations necessary to estimate and resolve the carrier cycle ambiguities for the respective rovers 130, and thus, frees the rovers from performing the calculations. Accordingly, the rovers need only have sufficient processing capacity and available power to perform the less-intensive, low-latency RTK baseline and position calculations. As discussed, the RTK server may also provide to the rovers 130 a set of virtual base station GNSS measurements that further reduce the processing requirements at the rovers.

The system 100 operates at essentially the same latency as a non-centralized RTK system, which employs complex and expensive rovers which have the power and processing capacity to relatively quickly perform their own latent matched updates as well as their own low latency RTK baseline and position calculations. The system 100, however, achieves the same overall total low latency of the non-centralized RTK systems using less complex and less expensive rovers. Accordingly, the system 100 can operate with, for example, relatively low cost mobile receivers that have reduced power and processing capabilities, that is, power and processing capabilities sufficient only to perform the less processing-intense, low latency RTK baseline and position calculations.

The RTK server 110 may also readily perform calculations that would not be practical even at the complex and expensive rovers that are used in the prior non-centralized RTK systems. For example, the RTK server 110 may use fully-populated measurement covariance matrices to improve the modeling of atmospheric, geometric and/or other environment-based error conditions, and so forth. Alternatively or in addition, the RTK server may use the base station GNSS measurements and, as appropriate, correction information, from multiple base stations and/or the GNSS measurements from multiple rovers to improve the estimates of the atmospheric, geometric, or other errors in the regions in which the base stations and rovers are operating.

Another advantage of having the matched update calculations performed at the RTK server 110 and the instantaneous RTK baseline and position calculations performed at the rovers 130 is that the rovers need only transmit their GNSS measurements to the RTK server, since the RTK server has access to all of the other information required for the matched updates, such as, for example, the satellite orbit and clock information and the system state models for the atmospheric, geometric and other error conditions. Further, the RTK server 110 need only transmit to the rovers the ambiguities and the base station GNSS measurements, assuming the base stations do not transmit their measurements to the rovers, and thus, the system may operate with relatively low bandwidth requirements. If the base stations provide their base station GNSS measurements to the rovers, the RTK server 110 need only transmit the ambiguities to the rovers when the ambiguities change.

The RTK server 110 may also receive pertinent information from other sources through, for example, an Internet connection or other network connection (not shown). The RTK server may thus have access to information, such as, precise satellite orbits, precise clocks, atmospheric conditions, and so forth, that can be utilized in the system models and/or in the calculations of the ambiguities and/or correction information apart from the operations of the base stations 120 and the rovers 130. The RTK server may package and rebroadcast certain or all of the information to the rovers for use in the low-latency RTK solution calculations. The RTK server 110 may also transmit to the rovers tracking assistance information that includes a list of satellites in view, Doppler frequencies, current time, and other information that allows the rovers to improve GNSS satellite signal tracking performance.

The communications between the RTK server 110, the base station 120 and/or the rovers 130 may be over communication lines 115, by broadcast, and/or transmitted by wire or wirelessly directly to and from the respective rovers and the base stations. Thus, the rovers and base stations include appropriate circuitry and, as appropriate, antennas, to receive, process and/or transmit the measurements and information.

Figure 2:
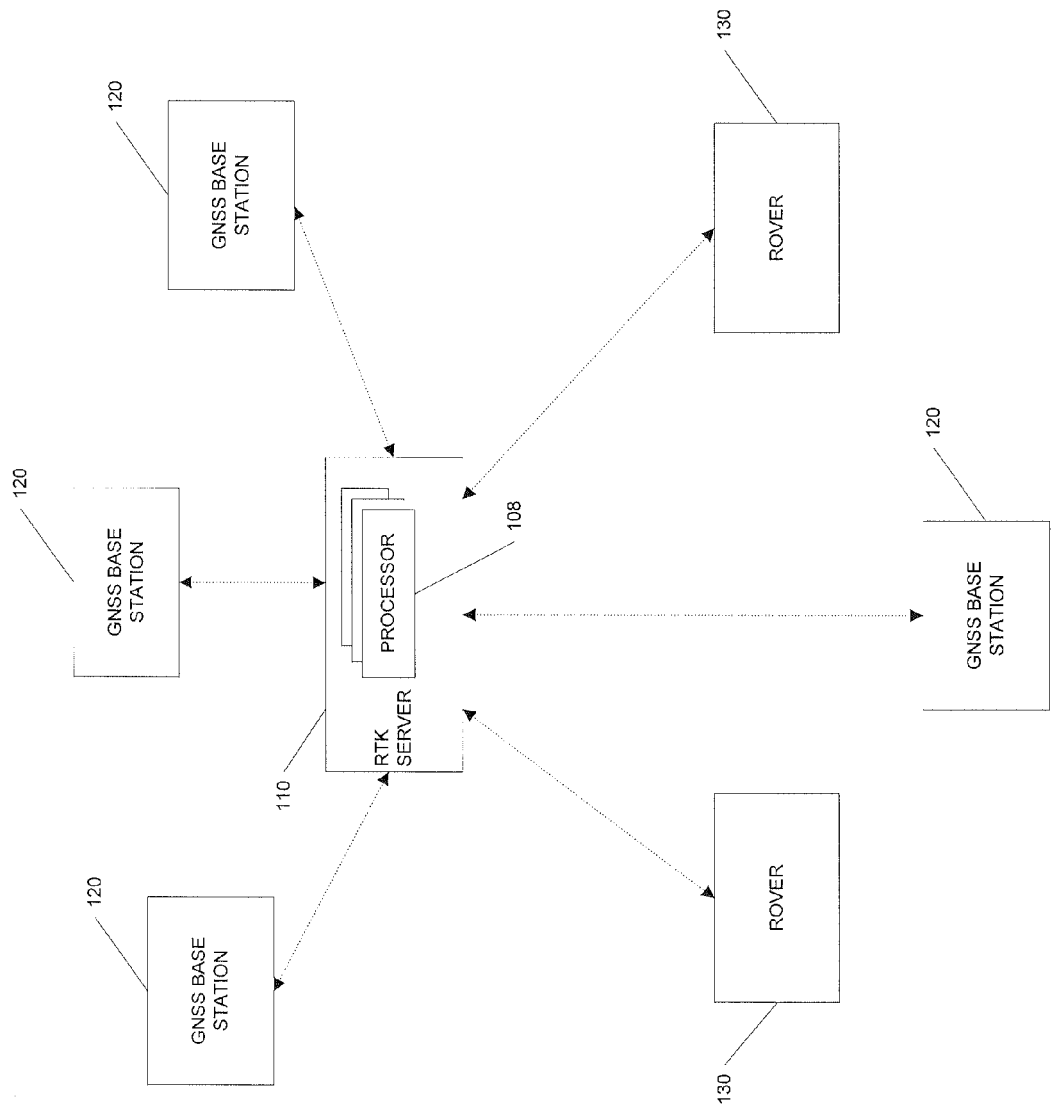
FIG. 2 is a functional block diagram of an alternative system constructed in accordance with the invention.

Referring now to FIG. 2, in a second example, the RTK server 110 receives base station GNSS measurements from multiple base stations 120 and GNSS measurements from multiple rovers 130. The RTK server performs matched updates for various base station-rover combinations. Alternatively, or in addition, the RTK server 110 may manipulate the data provided by all or a plurality of the base stations 120 and the respective rovers 130 to formulate appropriate system models, and so forth, for a network RTK system. Further, using the processing capacity of the processor 108, the RTK server may simultaneously perform the processing-intensive matched updates for a given rover 130 using the data provided by all or a selected plurality of the base stations, treating the base stations as individual base stations, networked base stations, or both.

The simultaneous processing of matched updates for multiple base stations and rovers is not typically possible in a non-centralized RTK system, even with the complex and expensive rovers utilized in such systems. Accordingly, virtual base stations and/or master base stations are instead utilized, to ease the processing burden on the rovers. However, the calculations required to introduce a virtual base station into the system and/or utilize a master base station add complexity and overhead to the non-centralized system and may introduce longer latencies into the matched update calculations performed by the rovers. The system 100 can operate with a virtual and/or a model base station without introducing additional rover overhead by having the RTK server 110 perform the necessary calculations using the base station GNSS measurements and the rover GNSS measurements that are already being provided to the RTK server.

Further, the system 100 may batch process the GNSS measurements from multiple rovers to, for example, determine more accurate system models. The RTK server 110 may also determine, based on the system dynamics, multipath corrections and/or quality levels for the base station GNSS measurements and the rover GNSS measurements, and transmits the results to the rovers. The rovers can then use the information, as appropriate, to weight respective GNSS measurements for use in the RTK baseline and position calculations and/or to perform known multipath mitigation calculations.

The system 100 is thus more flexible than the known prior RTK systems, which operate either as a network RTK system or as non-networked RTK system and with either actual base stations or a virtual or model base station. In addition, the system 100 operates with improved correction information using more accurate system models and/or quality of measurement information. Further, the system 100 is able to achieve the flexibility and improvement without increasing latencies above those associated with the known non-centralized RTK systems that employ complex and expensive rovers.

The RTK server 110 may provide the satellite ephemeris to the rovers 130. Alternatively, the rovers 130 or the base stations 120 may provide such information to the RTK server. Similarly, the satellite coordinates may be calculated by the rovers and/or the base stations and provided to the RTK server. Further, the satellite orbit corrections may be provided to the rovers directly from the base stations or from other sources. Accordingly, the operations of the system 100 may be customized based on the processing capabilities, power and bandwidth available at the respective base stations and rovers.

The RTK server 110 may consist of one or multiple communicating servers. As discussed the processor 108 may consist of one or multiple processors. Further, the RTK server 110 may operate in an RTK network that utilizes a virtual base station and/or a master base station, to make the network available to lower power, less complex rovers. Respective base stations may be in known positions determined by survey, and so forth, or may be stationary with their positions determined from the GNSS satellite signals alone or using a differential global positioning system, precise point positioning, and/or other known techniques for determining precise positions.

What is claimed is:

1. A real time kinematic (RTK) system comprising:
   one or more base stations at stationary locations;
   one or more remote receivers;
   an RTK server with one or more processors, the server receiving base station Global Navigation Satellite System (GNSS) measurements from the one or more base stations and GNSS measurements from the one or more remote receivers over a given period of time and performing matched updates to estimate and resolve ambiguities for the one or more remote receivers, the server providing the resolved ambiguities to the respective remote receivers; and
   the one or more remote receivers utilizing the base station GNSS measurements and the ambiguities provided by the RTK server and calculating RTK baselines and positions based on instantaneous GNSS measurements made by the respective rovers.

2. The RTK system of claim 1 wherein the remote receivers have limited processing power and capacity that are sufficient for performing low-latency RTK base line and position calculation.

3. The RTK system of claim 1 wherein the RTK server provides the ambiguities as real-valued ambiguities.

4. The RTK system of claim 1 wherein the RTK server further resolves the ambiguities and provides the ambiguities as resolved integers.

5. The RTK system of claim 1 wherein
   the base station GNSS measurements are provided to the one or more remote receivers by either the RTK server or the base stations.

6. The RTK system of claim 1 wherein
   the RTK server further provides to the one or more rovers correction information associated with one or more of satellite orbits, atmospheric conditions, geometric conditions and environment-based conditions, and
   the one or more rovers use the correction information to calculate RTK baselines and positions.

7. The RTK system of claim 6 wherein the RTK server utilizes GNSS measurements from multiple base stations to determine the correction information.

8. The RTK system of claim 3 wherein
   the RTK server provides acquisition and tracking assistance information to the one or more remote receivers; and
   the one or more remote receivers utilize the assistance information to acquire and track GNSS satellite signals.

9. The RTK system of claim 6 wherein the RTK server updates system state models during the matched updates to produce the atmospheric, geometric and environment-based correction information.

10. The RTK system of claim 1 wherein the RTK server calculates the matched updates for a given remote receiver and a single base station.

11. The RTK system of claim 10 wherein the base station and the RTK server are co-located.

12. The RTK system of claim 1 wherein the RTK server calculates matched updates for a given remote receiver and multiple base stations.

13. The RTK system of claim 12 wherein the RTK server operates with multiple base stations as an RTK network and provides to the given remote receiver correction information for the network.

14. The RTK system of claim 1 wherein the RTK server calculates and provides to the one or more rovers information relating to one or both of multipath conditions and quality of measurement.

15. A method for determining precise position comprising:
receiving GNSS signals at one or more base stations located at known locations and providing base station GNSS measurements periodically to an RTK server;
receiving GNSS signals at one or more remote receivers and periodically providing GNSS measurements to the RTK server;
at the RTK server performing matched updates using the GNSS measurements from the one or more base stations, known positions of the one or more base stations, and the GNSS measurements from the one or more remote receivers and providing ambiguities to the one or more remote receivers; and
at the remote receivers determining RTK baselines and positions using the base station GNSS measurements, the known base station positions, the ambiguities and instantaneous GNSS measurements at the remote receivers.

16. The method of claim 15 further including the RTK server resolving the ambiguities as integers and providing the ambiguities as resolved integers.

17. The method of claim 15 further including the base stations determining the respective known locations from the GNSS signals.

18. The method of claim 15 further including the RTK server manipulating the measurements from one or more of the base stations and one or more of the remote receivers to formulate system models for one or more of atmospheric conditions, geometric conditions and environments-base conditions.

19. The method of claim 15 further including at the RTK server, processing the matched updates for multiple base stations and remote receivers simultaneously.

20. The method of claim 15 further including, at the RTK server, processing the measurements from the base stations and the remote receivers as one or both of a networked RTK system and a non-networked RTK system.

* * * * *